United States Patent [19]
Linden et al.

[11] Patent Number: 6,021,057
[45] Date of Patent: Feb. 1, 2000

[54] INVERTER SYSTEM

[75] Inventors: Wilhelm Linden, Erlangen; Hartmut Schorrig, Pinzberg, both of Germany

[73] Assignee: Siemens Aktiengesellschaft, Munich, Germany

[21] Appl. No.: 09/194,449

[22] PCT Filed: May 9, 1997

[86] PCT No.: PCT/DE97/00943

§ 371 Date: Jun. 22, 1999

§ 102(e) Date: Jun. 22, 1999

[87] PCT Pub. No.: WO97/44887

PCT Pub. Date: Nov. 27, 1997

[30] Foreign Application Priority Data

May 21, 1996 [DE] Germany ............... 196 20 442

[51] Int. Cl.[7] .................................................. H02M 7/23
[52] U.S. Cl. ............................... 363/65; 363/71; 363/78
[58] Field of Search ............................. 363/65, 71, 95, 363/97, 131, 78, 16

[56] References Cited

U.S. PATENT DOCUMENTS

| | | | |
|---|---|---|---|
| 5,187,656 | 2/1993 | Kurakake | 364/167.01 |
| 5,499,177 | 3/1996 | Ichihara | 363/37 |
| 5,847,950 | 12/1998 | Bhagwat | 363/65 X |
| 5,886,890 | 3/1999 | Ishida et al. | 363/71 |

FOREIGN PATENT DOCUMENTS

| | | |
|---|---|---|
| 0 469 872 | 2/1992 | European Pat. Off. . |
| 0 469 873 | 2/1992 | European Pat. Off. . |
| 8-289591 | 11/1996 | Japan . |

OTHER PUBLICATIONS

*T. Schutze et al., "Low Floor Trams with IGBT–3–level Inverter", Fifth European Conference on Power Electronics and Applications, Sep. 16, 1993.

*D.H.E. Butler et al., "Compensation of a Digitally Controlled Static Power Converter for the Damping of Rolling Mill Torsional Vibration", Conference Record of the 1990 IEEE Industry Applications Society Annual Meeting, Oct. 12, 1990.

*F.R. Vidil et al., New 1675–mm Hot Strip Mill for an Feng Steel Co., Taiwan, Iron & Steel Engineer, Bd. 67, Nr. Nov. 11, 1990.

*Primary Examiner*—Y. J. Han
*Attorney, Agent, or Firm*—Kenyon & Kenyon

[57] ABSTRACT

A converter system, in particular for supplying electrical drives with direct current or DC voltage, or with alternating current or AC voltage, at a specifically matched frequency or for dynamic power factor correction. The converter system has at least one converter which has power semiconductors which can be switched on and/or off. It is possible to influence the current flow through the power semiconductors by adjusting the times at which the power semiconductors are switched on and off. It is also possible to influence the desired overall voltage or the desired overall current at the output of the converter by suitably controlling the times at which the individual power semiconductors of the converter are switched on and off. At least one converter is assigned at least one automation unit, which is physically separated from it and is logically connected to the power semiconductors via at least one bus system, by means of which the desired times at which the individual power semiconductors are switched on and off are adjustable.

17 Claims, 3 Drawing Sheets

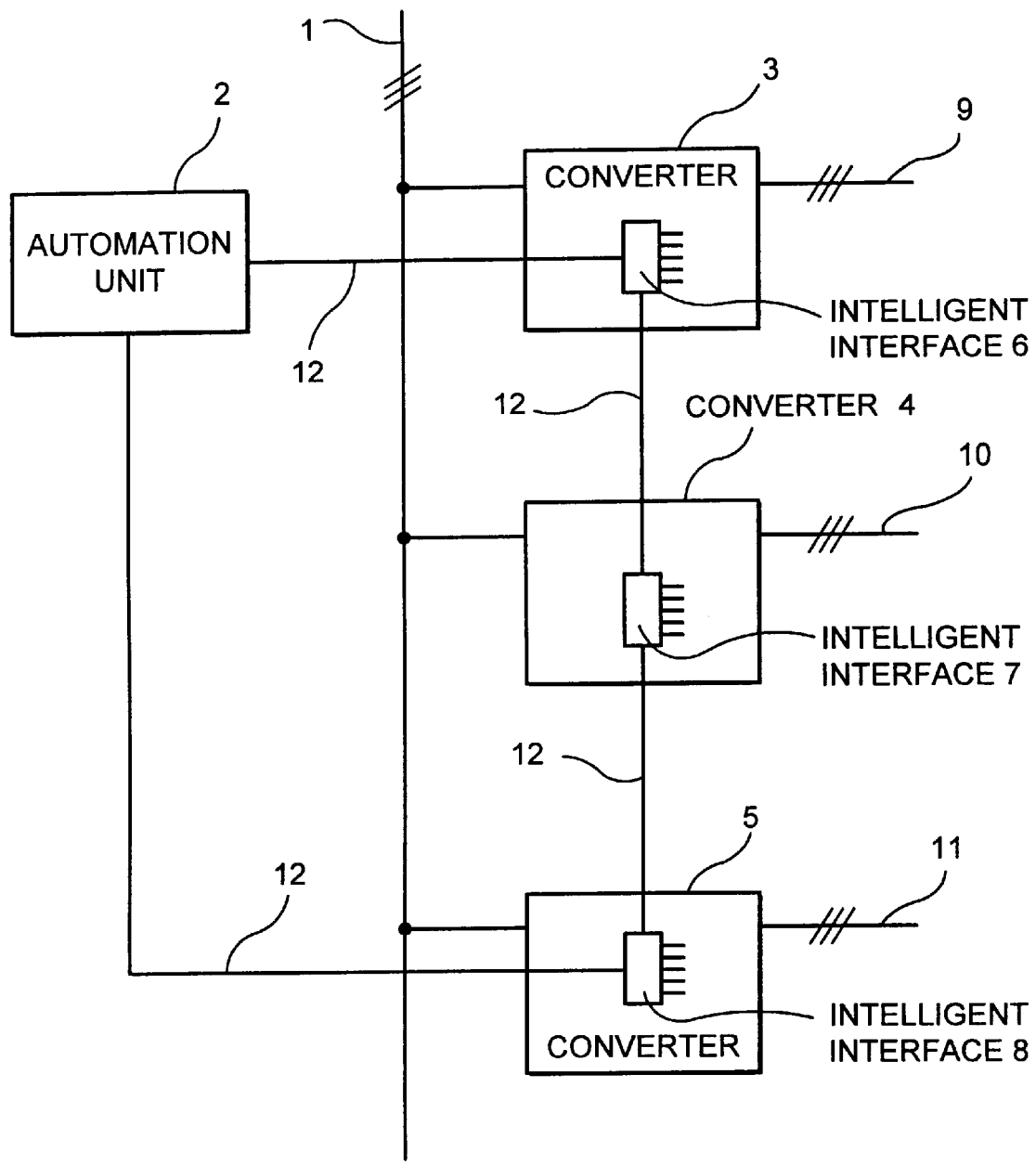
F I G. 1

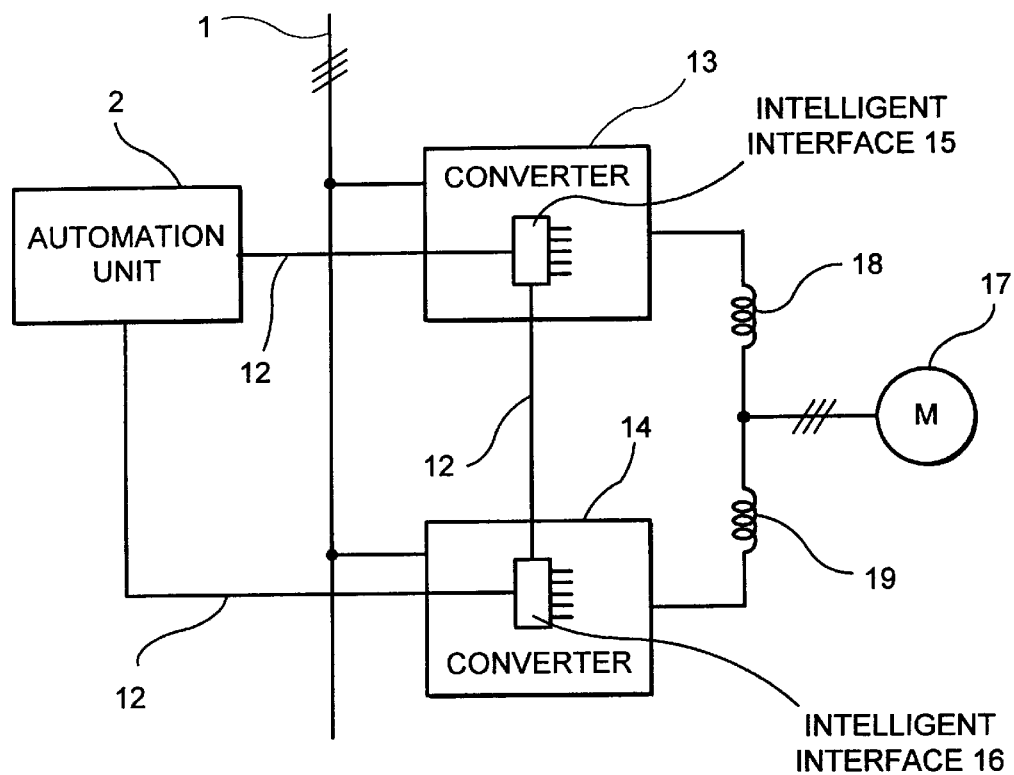
F I G. 2
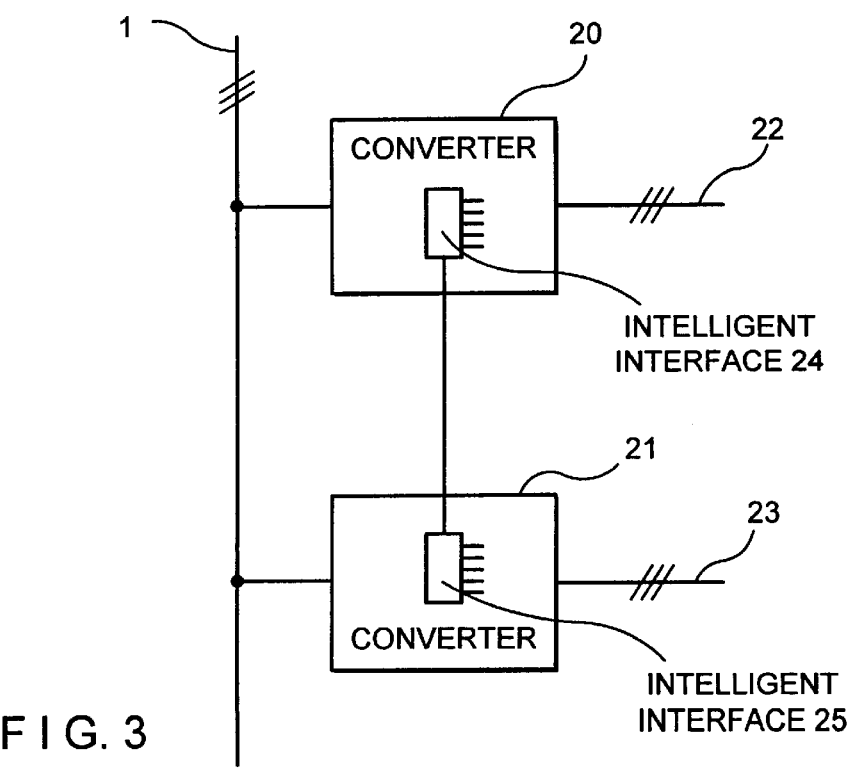
F I G. 3

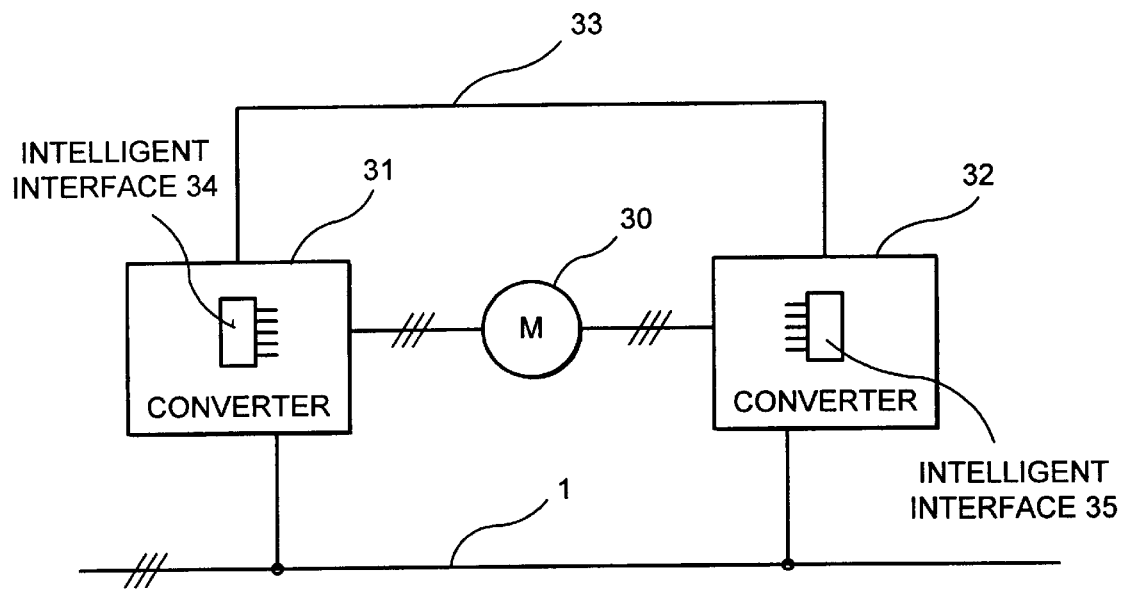
F I G. 4
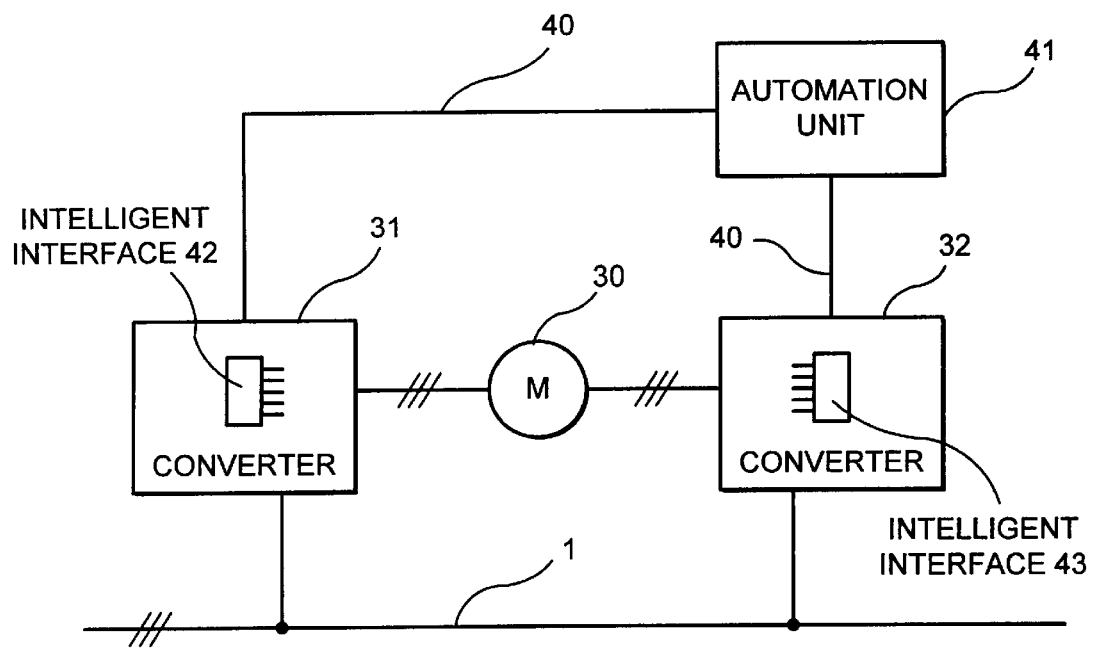
F I G. 5

INVERTER SYSTEM

FIELD OF THE INVENTION

The present invention relates to a converter system in particular for supplying electrical drives with direct current or DC voltage, or with alternating current or with AC voltage at a specially matched frequency or for dynamic power factor correction having at least one converter which has power semiconductors which can be switched on and off.

BACKGROUND INFORMATION

In the case of converters up to medium ratings (power outputs) (1. . . MW), the control and regulation and the power section can be located in one unit. All the connections are then expediently designed as a single signal connection. There are no physically separated power sections.

However, in the case of converters having relatively high ratings and converters in the megawatt range, it is sometimes technically expedient or desirable to separate the control and regulation and the power section. The problem arises, in particular, of driving physically separated power cabinets from one controller and regulator. Conventionally, in these applications, individual signals have been transmitted in cable harnesses, etc. The synchronism of switching the active power devices is thus not a problem since the only delay times which occur are in cables (inductance of cables, etc.) in the ns range.

However, this procedure is subject to various problems. Thus, for example, the costs for a non-integrated control system rise with the complex wiring, since individual wiring is very expensive. Furthermore, testing connections in individual wiring is complex and expensive, since each individual connection must be checked. Because of the high wiring outlays, it is frequently impossible to design this wiring in redundant form, for economic reasons, which leads to the converter failing in the event of failure of a single connection.

The point-to-point connections in conventional converters are copper cables, which results in further problems because of electrical and electromagnetic interference from the outside or from the converter itself. The necessity for the individual cables to be DCdecoupled, in order to avoid earth loops, leads to additional costs for such a converter system.

The object of the present invention is to provide a converter system having converters in the megawatt range, which overcomes the abovementioned problems.

The object is achieved according to the present invention by a converter system having at least one converter which has power semiconductors which can be switched on and/or off it being possible to influence the current flow through the power semiconductors by adjusting the times at which the power semiconductors are switched on and off, it being possible to influence the desired overall voltage or the desired overall current at the output of the converter by suitably controlling the times at which the individual power semiconductors of the converter are switched-on and off, and at least one converter being assigned at least one automation unit, which is physically separated from it and is logically connected to the power semiconductors via at least one bus system, by means of which the desired times at which the individual power semiconductors are switched on and off are adjustable.

It is also advantageous for the automation unit to be physically connected to the converter via at least one, in particular serial, bus system. In this way, it is possible to dispense with the individual point-to-point connections from the automation unit to the power semiconductor. According to the present invention, it is furthermore possible to design the connection between the automation unit and the semiconductors in a redundant manner, since this is possible at an acceptable cost in the physical bus system.

In another embodiment of the present invention level 1 according to ISO standard 7496 is designed as an optical waveguide, which avoids electromagnetic interference at the connection between the automation unit and the converter.

BRIEF DESCRIPTION OF THE DRAWINGS

FIG. 1 shows a first embodiment of a converter system according to the present invention.

FIG. 2 shows a second embodiment of the converter system according to the present invention for controlling a motor and having physically separated parallel-connected power sections.

FIG. 3 shows a third embodiment of the converter system according to the present invention having an integrated automation unit and two physically separated power sections.

FIG. 4 shows a fourth embodiment of the converter system according to the invention for controlling a motor in a tandem circuit.

FIG. 5 shows a fifth embodiment of the converter system according to the present invention for controlling a motor in the tandem circuit.

FIG. 1 shows a converter system according to the present invention having three converters 3, 4 and 5 at whose outputs 9, 10 and 11 an AC voltage is present. In the exemplary embodiment shown in FIG. 1, converters 3, 4 and 5 are inverters. However, they may also be converters. In this case, DC voltage is present at outputs 9, 10 and 11 of converters 3, 4 and 5. Converters 3, 4 and 5 are supplied with electrical power via a main power supply system 1. In order to produce DC voltage or direct current or in order to produce AC voltage or alternating current at a suitable frequency, converters 3, 4 and 5 have power semiconductors which can be switched on and/or off. The power semiconductors of converters 3, 4 and 5 are controlled and coordinated by means of an automation unit 2, which is connected via an optical waveguide 12 to intelligent interfaces 6, 7 and 8 of converters 3, 4 and 5. The control commands from automation unit 2 are passed on via intelligent interfaces 6, 7 and 8 to the power semiconductors in corresponding converters 3, 4 and 5.

Intelligent interfaces 6, 7 and 8 are synchronized. If there is only one converter or the converters may switch independently of one another, then the synchronization of the power sections is irrelevant. The first embodiment according to the present invention then relates to the use of a fast serial bus system instead of a large number of individual connections for coupling the control and regulation to the power section, a converter generally having dimensions in the order of magnitude of, for example, 2 m×1 m×2 m.

Standardized transmission protocols such as Ethernet, Profibus or the like are not used for serial transmission since they would not ensure transmission right up to the last μs, particularly when processing information. Instead of this, a suitable protocol has been defined which can be matched to specific situations.

A pair of circuits from the AMD company: TAXIChip (R) AM7968 and AM7969 have been used as the hardware basis for the serial-parallel conversion in conjunction with clock recovery. These circuits determine the serial coding of the information. A different type of serial-parallel conversion having similar characteristics may also be used instead of this.

Parallel-serial and serial-parallel conversion using TAXI-Chip circuits are characterized by:

A parallel byte (8 bits) is coded into 10 serial bit information items in two so-called 4B–5B codes.

The serial information is thus obtained in such a way that there are preferably not more than 3 identical bit information items successively. There is a signal change on the serial side after at the most 3 serial bits. It is therefore possible to recover the shift clock from the serial information via a PLL circuit (Phase Locked Loop).

A specific signal profile which preferably not as a data code on the basis of the 4B–5B code, is identified as a sync character. This provides byte synchronization for the serial-parallel conversion.

One of two strobe signals, either a command strobe or data strobe if data codes have been identified, is produced at the IC for each byte of the serial-parallel conversion, even when a SYNC character is received.

Certain serial signal codes, which are not data codes, are identified as command codes. There are 10 usable command codes for the 8-bit data length which is used with the 4B–5B code. In the solution according to the invention, these are used as a data frame (to mark the start and end of the data messages).

The occurrence of certain codes in the serial signal, which cannot be assigned either to the SYNC character or to command codes or data codes are identified as data transmission interference (violation) and are indicated at a pin on the IC, in synchronism with a strobe.

It is also possible to transmit 9 or 10 bits per data word, using a corresponding 5B/6B code. This design is not utilized for the converter system according to the present invention.

The baud rate for the serial signal was chosen to be 40 Mbaud. This corresponds to a data rate of 2 16-bit words per $\mu s$.

All the data to be transmitted are organized in messages. The messages start and end with a command byte, which is identified by the TAXIChips as such.

The first 5 data bytes after a command byte at the start of a message have special meanings for hardware control of the message traffic:

1 byte sender code (4 bits) and priority (max. 4 bits, 35 3 bits used)

2 bytes destination address of the information, each bit of 16 is assigned to a station so that it is possible to address one station, a plurality of stations or all stations.

1 byte buffer number of the information in 6 bits and 1 bit of information defining whether an interrupt is intended to be initiated on receipt.

The buffer number is used to write the data into the correct RAM area in the receiver station (part of the CPU RAM, access via DMA (Direct Memory Access)). No software cost is therefore required for passing data to the correct working areas.

1 byte repetition of the buffer number with XOR mask and shifted bits, as information protection. The message is valid only if this byte matches the preceding byte. The check is carried out by hardware.

Other bytes in the header of the message are used for software processing with standard meanings: command, tag number, process number, length. Once again, there is an idea here as to how incompletely transmitted messages are identified by software. There may be a problem that, in the case of hardware reception, the data information is written directly to the destination RAM. If a disturbance occurs during transmission, then the writing of the data does not continue. Superimposing the preceding RAM content produces non-consistent information. An interrupt is not necessarily triggered, which indicates the disturbance and evaluates it by software. The following arrangement of header information has been chosen to allow a processing programme to identify data consistency:

2 byte length of the message in words of 16 bits. After the information has been processed, 0 can be entered here. When new data are transmitted, then the symbol here should not be 0. This makes it possible to identify: new data present. This is a semaphore function for the processing of data.

2 bytes tag number of the message. Successive messages should never have the same tag number and, for simplicity, it should always be in continuous numeration. On the one hand, this makes it possible to identify whether any message is missing, and on the other hand it is possible to identify that a new message has been received.

If only the length is transmitted in the event of a fault for example, then the unchanged tag number makes it possible to identify that no new data have been transmitted.

The tag number is repeated once again, as at the start, at the location data start+message length. This is the critical mechanism for identifying data consistency. If the tag numbers at the front and rear are not identical, then either the message is still being transmitted or it has been terminated because of an error.

Each station can send data at any time. No master or master transfer is looked for.

If a message is circulating in the ring, then this message is recorded at each station with its priority in the first data byte after the start command byte of the message. The message is received and is sent on to the following station in the ring, delayed by two bytes (echo). This is irrespective of the question as to whether the message is addressed to the respective station.

If a send request is present at a station, then this is reset by hardware if a received message or echo message having the same or higher priority is identified. The message to be sent is not output until after the end of the echo message. This is done by hardware processing.

If the priority of the message to be sent is higher than a message which has been identified on reception or in the echo, then the echo message is ignored and the message to be sent is started immediately. In the ring, the sending station for the lower priority message will use the circulating echo to identify that another message is starting before its own message has been received completely. Thus, this station will repeat the send request from the start after the end of reception or of the echo of the higher priority message.

The same mechanism is also used if 2 stations start to send simultaneously and this condition cannot be detected between them because of the propagation time in the ring. If the messages have the same priority, the station number is used to decide the priority.

The controller and regulator use software algorithms (for example, field-oriented regulation with a subsequent control statement) to determine the times and time duration for individual active power device positions. The active power device positions can in this case be transmitted coded, for example, using 2 bits for 3 sensible combinations for driving 4 active devices, in the case of a 3-point converter.

A plurality of successive active device switching commands, which are calculated in one sampling time period of the software, are then transmitted, with the active device position and time or time duration by the controller and regulator in one message. Monitoring information and sampling information for analogue value detection are linked to this information.

The switching information is processed in the power section in that the time differences or times and switching information, which are written to a FIFO (First In First Out Buffer) via software on receipt of a message, are read out individually and successively after the respective time has elapsed. A timer (hardware) implements the correct switching time to an accuracy of less than 1 µs. When the information for analogue value triggering has been read from the FIFO, an integrator is latched by hardware. A message is produced in the power section, which initiates the sampling time interrupt on the controller and regulator. Analogue values which are used in the sampling time interrupt of the controller and regulator are sent in a further message which is produced after this, for time reasons.

The time regime is thus governed by the processing of the switching information in the power section.

There is a comprehensive hardware circuit in the power section for message reception and message production, and this circuit is implemented using a freely programmable logic circuit MCA, Type Xilinx). The production of the switching information is likewise implemented via another LCA, in the same way as the detection and digital integration of the analogue values. The use of LCAs is in this case technically worthwhile and, because of matching to different projects (number of valves, etc.) possibly necessary, but not necessary because of the solution according to the invention.

There is a CPU (Central Processing Unit, microprocessor) in the power section for software processing of message data, testing, reallocation to the LCAs and, to some extent for algorithms for control and regulation, to be precise an SAB C 165, 16-bit controller with onchip functions. The CPU is completed by an external RAM of 256 kbytes and external flash EPROM.

Auxiliary signals for the controller and regulator are also detected in the substation, such as door switches, etc. (binary monitoring operations) or a drive for relays for precharging, etc. Information transmission from and to these hardware components is also carried out via messages, with software evaluation.

The same circuit is provided for message production and processing (LCA) in the automation system. The same C165 CPU is also used for software evaluation of the messages. DMA is used for coupling to the central CPU for the controller and regulator, in the present case a PM4 CPU assembly from the SIMADYN-D (bus coupling). In this case, the LCA is addressed by 2 CPU buses independently of one another, for message processing. Circuits are provided there for conflict avoidance in the event of simultaneous or contradictory access. Direct writing to and reading from the external RAM to the C165 via the PM4 bus (LE bus) is possible via a further circuit, implemented in the same LCA as the message controller. The software data interchange message traffic to the controller and regulator takes place in this way.

If a plurality of power sections are connected to a controller and regulator by means of the ring bus according to the invention, then they are not synchronized in the solution proposed here up to this point. That is to say, each power section has its own time regime. This is possible if the power sections do not need to switch synchronously, for example, when driving different motors. However, this results in problems, such as floating sampling times.

Time synchronization in a plurality of power sections is absolutely essential when they connect physically separated power sections (power cabinets) to the same load (motor) or from the same mains system.

Time synchronization in a plurality of power sections is desirable even if different loads or power supply phases are connected since this overcomes problems with floating sampling times.

In the first embodiment according to the present invention, it is clear that the time regime of the power section is controlled on the basis of the processing of the valve drive information. The controller and regulator are subordinate in the time regime.

From the point of view of the circuit for the power valves, time synchronization is required in the power sections at least with an accuracy of less than 10 µs, and inaccuracies of this order of magnitude can be coped with by compensation inductors. Because of the desire to minimize these compensation inductors and for fine differential current regulation, possibly at relatively high valve switching frequencies as are possible, for example, with IGBT transistors, the time differences should be implemented to be considerably better than 1 gs. Without using the technique at the worst-case limit, the solution according to the invention allows an accuracy between adjacent stations of ±50 ns and an accuracy between stations that are further apart in the ring of ± the number of stations times 50 ns. The system clock at 20 MHZ which is used is standard for the CPU system and can be processed well by the LCAs.

The use of the first embodiment according to the present invention with time synchronization is also necessary when the controller and regulator are located in one of a plurality of power sections and is connected there directly to the power section, without a serial bus, even though a second power section (power cabinet) must switch synchronously with the first.

One station in the ring is the master timer and contains a timer which models the time over at least 2 maximum sampling times. Furthermore, the counter can revolve. The timing resolution is, for example, 250 ns. The counter, with a revolution time of 16 ms, has 16 bits. All the stations are synchronized by the master timer.

Time pulse formation takes place, for example, every 128 µs. This is derived from the 0 crossing of the corresponding lower counter section of the master timer, in this case by the lower 9 bits. To be more precise, the time pulse is produced 1020 times 50 ns before the 0 crossing, that is to say when the count is 204 before the 0 crossing in the example.

The master timer in this case operates at the same clock rate as the message controller. A system clock of 50 ns is used in this case, in which every 5th clock edge has an active switching effect. This is implemented by a central release signal from the synchronous flipflop. This release signal is called the CLKL, for short (Clock for message traffic Lx), and the central clock at 20 MHZ is called the CLKC ("C" since it is also used by the CPU).

Whenever this time pulse is produced cyclically, a short information item made up of 2 bytes is sent irrespective of the message traffic otherwise taking place:

one of 4 tag command bytes for the time pulse
a data byte with the contents 255 (all bits set).

The message traffic otherwise taking place processes this time information without interference. For an active message producer, the production of data is stopped for this time, in order that the time pulse is passed on as an echo. The time pulse acts like an information pause for message reception. The time pulse is identified on the basis of its command byte.

The receiving station has a non-synchronous clock relationship with the sending station and a clock with a tolerance of ±1 per thousand.

However, after serial-parallel conversion in the TAXI-Chip of the receiver, the strobe signal is produced with the clock from the sender, that is to say the clock of the serial signal.

The receiver contains a circuit for synchronization of the data bytes to the clock of the receiver. The clock in this case means in particular the position of the strobe or data change after the serial-parallel conversion (governed by the clock of the sender) with respect to the central release clock CLKL. Message processing and the passing on of the message to the following station in the ring take place in synchronism with this CLKL. The CLKL has a period of 250 ns. The central clock for processing CLKC operates at 50 ns.

This synchronization circuit takes account of a difference in the clock frequencies between the sending station and its own clock of max. ±1 per thousand, which means that information must be delayed to an ever greater extent when, for example, the sending clock is higher. No data loss may occur in this case up to the end of the message.

This synchronization circuit supplies pulses by means of which a counter can be zeroed and started which determines the clock of the strobe at the serial-parallel converter in the time pulse command byte with respect to CLKL, including an additional delay by 1 CLKL period, which is necessary when message traffic is taking place. This counter operates using the system clock CLKC (50 ns) and thus determines a delay in the range 0 to 9 in units of 50 ns. Clocking with the system clock of 50 ns in this case produces an uncertainty of 50 ns.

This value of the delay, resulting from the synchronization of the received signal to the CLKL, is now subtracted from the received time information. The time information is taken from the byte after the time command byte (bits 9 to 2) and the command byte (bits I and 0). The master timer has in this case sent the information item 1020, binary 1111 1111 00, see above.

In addition, a constant predetermined value having a length of 9 bits is also subtracted from the time information, this value including a constant delay of the serial input signal with respect to the serial output signal in the ring because of the internal processing, a delay time of the serial signal from the sender to the receiver because of physical delay times, in particular the delay time in the LWL.

10-bit long counter is loaded with this time information and is started at the CLKL-synchronous time, and is then decremented with the system clock CLKC. This counter is stopped on reaching the zero crossing. The zero crossing in this case takes place in the frame of the 50 ns CLKC clock synchronized to the zero crossing of the master timer. This is the actuating pulse for the timer in this station.

The time information is sent on as an echo, to be precise as just described with the corrected time information. The next station once again corrects this time information, taking account of the two components: synchronization of the position of the received information for processing and the delay time of the signal. Because it is not possible to confirm the position of the CLKC clocks in the stations, an error of 50 ns will in this case accumulate, and determines the accuracy. (Should this accuracy also be improved because of CLKC, then the CLKC must be formed by a PLL circuit synchronized to the received information. However, this is not implemented in the present case, nor is it considered to be necessary.)

The actuating pulse of the timer defines the time, to an accuracy of 50 ns (CLKC) at which the timer should pass through zero in the lower, (e.g., least significant) for example, 9 bits for 250 ns resolution. If there is a difference in the clock frequencies, the counter may, however, have a count other than 0, to be precise with a slight discrepancy if time information has been received continuously.

This discrepancy in the count and the divider upstream of the timer is intercepted in a register.

The upstream divider for the timer is now changed from the normal value of 5 (CLKC of 50 ns for resolution to 250 ns) to the value 4 or 6 on the basis of the positive or negative discrepancy, after equidistant times, for example, every 4 As, depending on whether a positive or a negative discrepancy has been identified. The discrepancy in the register is at the same time decremented for this clock (this is in the counter register).

One time step will thus last for 200 or 300 ns, followed by the normal 250 ns.

This is repeated until the discrepancy has reached 0. In the case of the maximum discrepancy resulting from the tolerance between the clocks, 0 must be reached before the next time pulse arrives.

The central release clock CLKE for all the synchronous circuits (not for the message traffic!) is derived from the upstream divider for the counter. This CLKE therefore runs synchronously in all the stations, within the framework of the above accuracy.

The counter is set to the overall time once on initialization, by software, via a normal message. The counter is then started at the first time pulse. Any discrepancy beyond the framework of the clock frequency tolerance is identified as a serious system defect.

The converter system according to the present invention is preferably used for supplying electrical drives and for power factor correction. It is furthermore preferably suitable for applications in which power levels in the megawatt range have to be regulated and set.

FIG. 2 shows a second embodiment of the converter system according to the present invention having two converters for controlling and regulating a motor 17, the outputs of converters 13 and 14 being separated via inductors 18 and 19. Power is supplied via a mains power supply system 1. The power semiconductors in converters 13 and 14 are controlled by means of an automation unit 2, optical waveguides 12 and intelligent interfaces 15 and 16, in an analogous manner to the regulation of the converter system in FIG. 1

FIG. 3 shows a third embodiment of the converter system having two converters 20 and 21, the voltage or the current being controlled at outputs 22 and 23 of converters 20 and 21 by means of an automation unit 24. Automation unit 24 is integrated in converter 20 and directly controls the power semiconductors in converter 20. Converter 21 has an intelligent interface 25, which is connected to automation unit 24 via an optical waveguide 12. The control commands which are produced in automation unit 24, for the power semiconductors of converter 21, are transmitted via optical waveguide 12 to intelligent interface 25, which drives the power semiconductors in converter 21 in accordance with the control commands from automation unit 24. Power is supplied to converters 20 and 21 via a main power supply system 1.

FIG. 4 shows a fourth embodiment of the converter system according to the present invention for controlling a motor 30, in a tandem circuit, by means of two converters 31 and 32 which are supplied with power via a mains power supply system 1. Converter 31 is controlled via an automation unit 34, via which converter 32 is likewise controlled, which is connected to automation unit 34 via an optical waveguide 33 and an intelligent interface 35. The control commands from automation unit 34 are passed on from intelligent interface 35 to the power semiconductors in converter 32.

FIG. 5 likewise shows a motor 30 having two converters 31 and 32, in a tandem circuit. Power is in this case supplied via a mains power supply system 1. The power semiconductors in converters 31 and 32 are controlled via an automation unit 41 which is connected to intelligent interfaces 42 and 43 via optical waveguide 40. Intelligent interfaces 42 and 43, which are integrated in converters 31 and 32, pass the control commands on from automation unit 41 to the power semiconductors in converters 31 and 32.

What is claimed is:

1. A converter system, comprising:
   a plurality of converters, at least one converter of the plurality of converters including power semiconductors which are switchable to an on state and an off state;
   at least one automation unit physically separated from the at least one converter and connected to the power semiconductors via at least one bus system, the at least one automation unit:
      adjusting a particular time at which the power semiconductors are switched into the on state and off state to influence a current flow through the power semiconductors, and controlling the particular time to control one of the desired overall voltage and the desired overall current at an output of the at least one converter; and
   intelligent interfaces, each of the intelligent interfaces being assigned to a corresponding one of the plurality of converters, each of the intelligent interfaces receiving the particular time and switching the power semiconductors into at least one of the on state and off state at the particular time, one of the at least one automation unit and the at least one converter sending a time standard for temporally synchronizing the intelligent interfaces with a precision of at least 10 μs.

2. The converter system according to claim 1, wherein the bus system includes a serial bus system.

3. The converter system according to claim 2, wherein the bus system includes an optical waveguide.

4. The converter system according to claim 2, wherein the bus system includes a ring connecting the at least one automation unit and the at least one converter.

5. The converter system according to claim 1, wherein the time standard temporally synchronizes the intelligent interfaces with a further precision of at least 50 ns.

6. The converter system according to claim 1, wherein the at least one automation unit is a single automation unit.

7. The converter system according to claim 6, wherein the at least one automation unit is physically assigned to the at least one converter.

8. The converter system according to claim 1, wherein at least one of the intelligent interfaces transmits current and voltage measurements in a rectifier via the at least one bus system to the at least one automation unit.

9. The converter system according to claim 1, wherein the at least one bus system transmits data including at least one of the particular time, current and voltage measurements, and the time standard at a rate of at least 5 Mbaud.

10. The converter system according to claim 9, wherein the rate is at least 20 Mbaud.

11. The converter system according to claim 1, wherein the bus system transmits data including at least one of the particular time, current and voltage measurements, and the time standard at a rate of 40 Mbaud.

12. The converter system according to claim 1, wherein the at least one converter operates with a continuous load in a rating range from 1 megawatt to 20 megawatts.

13. The converter system according to claim 12, wherein the rating range is between 2 megawatts to 10 megawatts.

14. The converter system according to claim 1, wherein the at least one converter operates with a surge load in a rating range from 2 megawatts to 30 megawatts.

15. The converter system according to claim 14, wherein the rating range is between 4 megawatts to 20 megawatts.

16. The converter system according to claim 1, wherein the converters supplies electrical drives with one of:
   a direct current or a DC voltage, and
   an alternating current or an AC voltage at a predetermined matched frequency.

17. The converter system according to claim 1, wherein the converters correct a dynamic power factor.

* * * * *